Aug. 31, 1954 M. R. RICHMOND 2,688,076
REVERSIBLE TRIANGULAR WAVE GENERATOR
Filed March 5, 1952 2 Sheets-Sheet 1
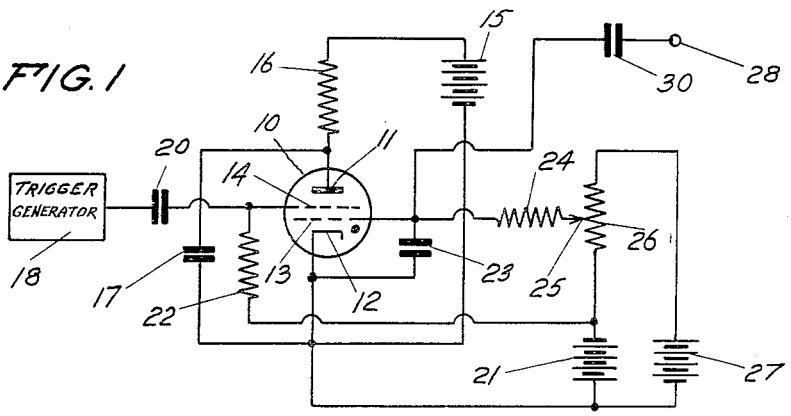
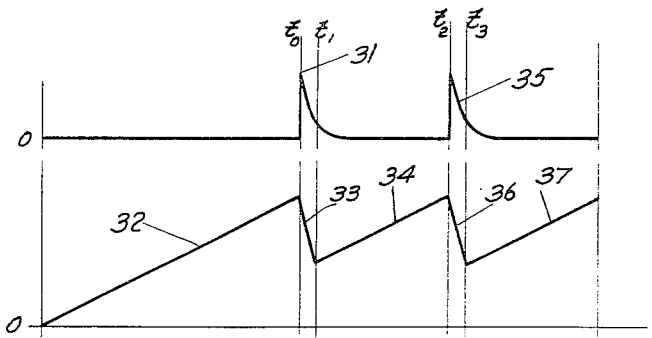
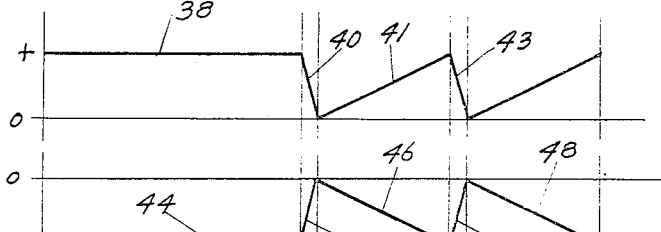
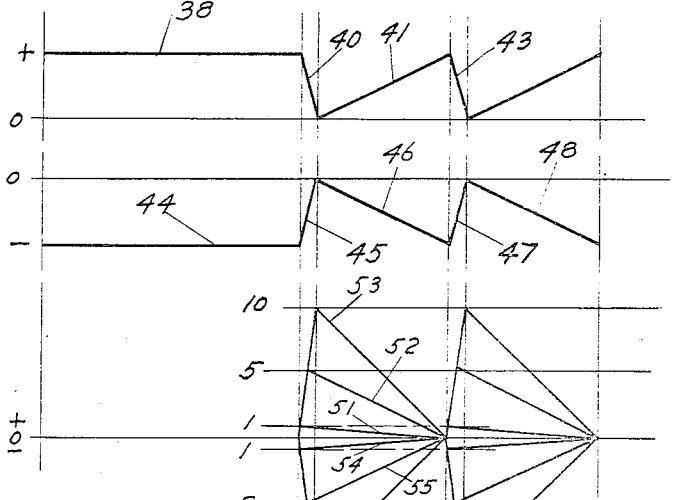
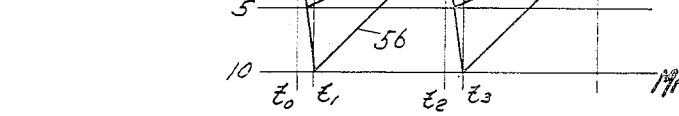
INVENTOR
MARTIN R. RICHMOND
BY Elmer J. Gorn
ATTORNEY

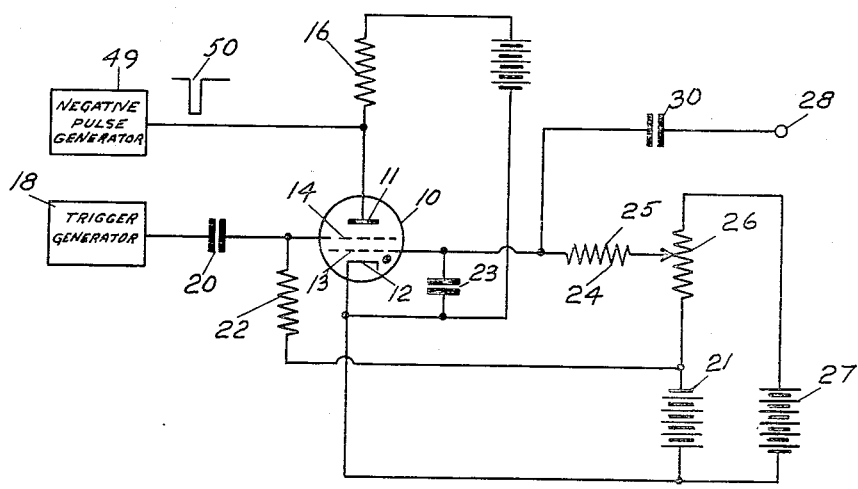

Patented Aug. 31, 1954

2,688,076

UNITED STATES PATENT OFFICE 2,688,076

REVERSIBLE TRIANGULAR WAVE GENERATOR

Martin R. Richmond, Watertown, Mass., assignor to Raytheon Manufacturing Company, Newton, Mass., a corporation of Delaware Application March 5, 1952, Serial No. 275,001

9 Claims. (Cl. 250—27)

This invention relates to reversible triangular wave generators utilizing grid-controlled gaseous discharge tubes.

In some applications it is desirable to have a triangular wave that is adjustable both in amplitude and polarity. By the present invention, this is accomplished with a grid-controlled gaseous discharge tube such as a thyratron. This invention makes use of the fact that, when a thyratron is conducting, the first control grid, the one nearest the cathode, assumes a potential in the order of about one hundred millivolts above that of the cathode whatever its potential prior to the conduction of the tube. This is done by connecting a capacitor between the first control grid of the thyratron and its cathode, and connecting the first control grid to a source of potential that may be either positive or negative in polarity and that may be varied in value. The thyratron is made to conduct at predetermined intervals for a predetermined time by known methods. When it is not conducting, the capacitor is charged to the potential applied to the first control grid. When the tube conducts, the capacitor discharges rapidly and the potential across it changes rapidly to that of the cathode. When the tube ceases to conduct, the capacitor charges relatively slowly up to the grid potential. The result is a triangular or saw-toothed wave form appearing across the capacitor. This wave form is negative-going if the potential on the grid is positive, and positive-going if the potential on the grid is negative.

Other and further advantages and features of the invention will become apparent from the following description, reference being had to the drawings wherein:

Fig. 1 is a schematic of a circuit embodying the invention;

Fig. 2a is a diagram showing the voltage with respect to time appearing at the second control grid;

Fig. 2b is a diagram showing the voltage with respect to time appearing at the plate;

Figs. 2c and 2d are diagrams of the voltage with respect to time appearing at the first control grid when the reference potential of this grid is positive and when it is negative, respectively;

Fig. 2e is a diagram showing the voltage with respect to time when different reference voltages are applied to the grid; and Fig. 3 is a schematic of a modified circuit embodying the invention.

In Fig. 1, the reference numeral 10 refers to a grid-controlled gaseous discharge tube, such as a thyratron, having a plate 11, a cathode 12, and first and second control grids 13 and 14, respectively. The plate 11 is connected to a source 15 of positive potential through a resistor 16, and is also coupled to the cathode 12 through a capacitor 17. The second control grid 14 is coupled to a source 18 of positive pulses through a capacitor 20, and to a source 21 of negative potential through a resistor 22. The first control grid 13 is coupled to the cathode 12 through a capacitor 23, and is connected through a resistor 24 to the arm 25 of a potentiometer 26. One end of the potentiometer 26 is connected to a source 27 of positive potential and the other end of the potentiometer is connected to the source 21 of negative potential. The first control grid 13 is also coupled to an output terminal 28 through a capacitor 30.

The operation of the circuit can best be understood by reference to the diagrams, Figs. 2a to 2e. When a positive-going pulse, such as pulse 31 of Fig. 2a, arrives at the second control grid at a time $t_0$ it causes the thyratron 10 to conduct. This discharges the capacitor 17 that has been charging prior to the firing of the tube along the line 32 of Fig. 2b. It now discharges, dropping the potential of the plate 11 along the line 33. When the potential drops below the conduction potential of the tube 10, it stops conducting at the time $t_1$. The capacitor 17 then begins to charge again along the line 34. When a second pulse 35 arrives at the second control grid at the time $t_2$, the tube again conducts, discharging the capacitor 17, and the plate potential drops along the line 36, as shown in Fig. 2b, until this voltage reaches a point at the time $t_3$ where it ceases to conduct and the capacitor 17 recharges along the line 37 to repeat the cycle.

When the tube conducts, if the first control grid 13 is connected to a point equidistant from the ends of the potentiometer 26, the grid remains at zero potential as there is no charge on the capacitor 23. However, if the arm 25 is positioned towards that end of the potentiometer 26 connected to the source of positive potential, there will be a positive charge on the capacitor 23, as shown by the line 38 in Fig. 2c. When the tube conducts at the time $t_0$, the grid 13 will fall to the cathode potential along the line 40. When the tube ceases to conduct at the time $t_1$, the capacitor 23 will recharge along the line 41 to the potential at which the arm 25 of the potentiometer 26 is set. At the time $t_2$ the tube again conducts and the capacitor 23 again discharges along the line 42 until the time $t_3$ when the tube ceases to conduct and the capacitor 23 commences to recharge along a line 43.

If the arm 25 is set closer to the end of the potentiometer 26 connected to the source 21 of negative potential, the capacitor 23 will be charged to a negative value represented by a line 44 in Fig. 2d. Again when the tube 10 conducts at time $t_0$, the potential of the grid 13 will return to the cathode potential along a line 45 in a positive direction. When the tube ceases to conduct at a time $t_1$, the capacitor 23 will be recharged to the negative voltage on the potentiometer arm 25 along a line 46. When the tube again conducts at the time $t_2$, the capacitor 23 will be discharged and its potential will rise to the cathode potential along the line 47. When the tube is again extinguished, the capacitor 23 will be recharged to the negative potential on the potentiometer arm 25 along a line 48.

Thus, a positive potential on the arm 25 of the potentiometer 26 causes a negative-going saw-toothed wave to appear at the output terminal 28, while a negative potential on the arm 25 will cause a positive wave to appear at the output. The capacitor 30 removes the direct current component of the voltage appearing across the capacitor 23, and the resistor 24 limits the current flow from the source 21 or 27 into the capacitor 23. The value of this resistor 24, together with the value of capacitor 23, is selected to give a time constant in the order of five to ten times the interval between firing pulses from the source 18.

A source 49 of negative pulses 50, shown in Fig. 3, may be substituted for the capacitor 17 and connected to the plate 11. These pulses 50 will serve to counteract the normal positive potential obtained from the source 15 to reduce the plate potential below that needed for conduction. The time of the occurrence of these negative pulses, with respect to the time of occurrence in the positive trigger pulses 31 and 35, determines the length of the period of conduction of the tube 10.

Fig. 2e shows how different settings of the potentiometer 25 result in different amplitudes and polarities of the wave form at the output terminal 28. For example, a setting of 1 volt negative will produce the wave form 51; a setting of 5 volts negative will produce the wave form 52, and a setting of 10 volts negative will produce the wave form 53. Similarly, settings of 1, 5, and 10 volts negative will result in wave forms such as those designated as 54, 55, and 56, respectively.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a triangular wave form generator, the combination of a grid-controlled gaseous discharge device having a plate, a cathode and first and second control grids, with means to cause the gaseous discharge device to conduct at predetermined intervals for a predetermined time comprising a capacitor connected between the plate and cathode, a capacitor in series with the said first grid and cathode, and a source of potential connected to the grid.

2. In a triangular wave form generator, the combination of a grid-controlled gaseous discharge device having a plate, a cathode and first and second control grids, with means to cause the gaseous discharge device to conduct at predetermined intervals for a predetermined time comprising a source of positive pulses connected to the second control grid, a capacitor connected between the plate and cathode, a capacitor in series with the said first grid and cathode, and a source of potential connected to the first control grid.

3. In a triangular wave form generator, the combination of a grid-controlled gaseous discharge device having a plate, a cathode and first and second control grids, with means to cause the gaseous discharge device to conduct at predetermined intervals for a predetermined time comprising a capacitor connected between the plate and cathode, a capacitor in series with the first grid and cathode, and a source of positive potential connected to the first said grid.

4. In a triangular wave form generator, the combination of a grid-controlled gaseous discharge device having a plate, a cathode and first and second control grids, with means to cause the gaseous discharge device to conduct at predetermined intervals for a predetermined time comprising a capacitor in shunt between the plate and cathode, a capacitor in series with the first grid and cathode, and a source of negative potential connected to the first said grid.

5. In a triangular wave form generator, the combination of a grid-controlled gaseous discharge device having a plate, a cathode and first and second control grids, with means to cause the gaseous discharge device to conduct at predetermined intervals for a predetermined time comprising a source of positive pulses connected to the second control grid, a capacitor in shunt between the plate and cathode, a capacitor in series with the first said grid and cathode, and a source of positive potential connected to the first control grid.

6. In a triangular wave form generator, the combination of a grid-controlled gaseous discharge device having a plate, a cathode and first and second control grids, with means to cause the gaseous discharge device to conduct at predetermined intervals for a predetermined time comprising a source of positive pulses connected to the second control grid, a capacitor in shunt between the plate and cathode, a capacitor in series with the first said grid and cathode, and a source of negative potential connected to the first control grid.

7. In a triangular wave form generator, the combination of a grid-controlled gaseous discharge device having a plate, a cathode and first and second control grids with means to cause the gaseous discharge device to conduct at predetermined intervals for a predetermined time comprising a source of positive pulses connected to the second control grid and a capacitor in shunt between the plate and cathode, a capacitor in series with the first grid and cathode, and a source of potential variable in both amplitude and polarity connected to the first control grid.

8. In a triangular wave form generator, the combination of a grid-controlled gaseous discharge device having a plate, a cathode and first and second control grids, with means to cause the gaseous discharge device to conduct at predetermined intervals for a predetermined time comprising a capacitor in shunt between the plate and the cathode, a capacitor in series with the first grid and cathode, and a resistor connected between a source of positive potential and a source of negative potential and a tap of said resistor connected to the first said grid.

9. In a triangular wave form generator, the combination of a grid-controlled gaseous discharge device having a plate, a cathode and first and second control grids, with means to cause the gaseous discharge device to conduct at predetermined intervals for a predetermined time comprising a source of positive pulses connected to the second control grid, a capacitor in shunt between the plate and cathode, a capacitor in series with the first grid and cathode, and a resistor connected between a source of positive potential and a source of negative potential and a tap of said resistor connected to the first said grid.

References Cited in the file of this patent

UNITED STATES PATENTS

| Number | Name | Date |
|---|---|---|
| 1,552,321 | Lea | Sept. 1, 1925 |
| 2,564,347 | Solomon | Aug. 14, 1951 |
| 2,564,573 | Loughren | Aug. 14, 1951 |
| 2,607,907 | Marshall | Aug. 19, 1952 |